(12) United States Patent  
Chen et al.

(10) Patent No.: US 7,489,457 B1
(45) Date of Patent: Feb. 10, 2009

(54) OPTICAL LENS MODULE

(75) Inventors: Yi-Chang Chen, Hsinchu (TW); Chih-Chien Lin, Hsinchu (TW); Jean-Yuan Lin, Hsinchu (TW); Hui-Ping Chen, Hsinchu (TW); Chih-Lu Hsu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/016,411

(22) Filed: Jan. 18, 2008

(30) Foreign Application Priority Data

Aug. 15, 2007 (TW) .................................. 96213489

(51) Int. Cl.
*G02B 7/02* (2006.01)

(52) U.S. Cl. .................. 359/819; 359/209; 359/210

(58) Field of Classification Search ................. 359/819, 359/196–200, 209, 210, 214, 224–226, 234, 359/236, 726; 348/42, 47, 81, 374; 250/208.1, 250/234, 235; 396/55
See application file for complete search history.

(56) References Cited

U.S. PATENT DOCUMENTS 6,198,565 B1 3/2001 Iseki et al.
6,317,169 B1 11/2001 Smith
6,714,364 B2 * 3/2004 Suh ............................. 359/813

FOREIGN PATENT DOCUMENTS

TW       I243276       11/2005

* cited by examiner

*Primary Examiner*—Loha Ben
(74) *Attorney, Agent, or Firm*—J.C. Patents

(57) ABSTRACT

An optical lens module including a foundation, at least one actuator, a lens base, an optical lens, at least one shaft, and at least one rocker arm is provided. The actuator is disposed in an accommodation space, defined inside the foundation, and fixed on the foundation. The lens base is disposed in the accommodation space and beside the actuator. The optical lens is disposed on the lens base. The shaft has a first end and a second end opposite to the first end. The first end is solidly connected to the lens base. The second end is connected to the foundation. The rocker arm has a third end and a fourth end opposite to the third end. The third end is solidly connected to a portion of the shaft between the first end and the second end. The fourth end is connected to the actuator.

20 Claims, 8 Drawing Sheets

OPTICAL LENS MODULE

CROSS-REFERENCE TO RELATED APPLICATION

This application claims the priority benefit of Taiwan application serial no. 96213489, filed on Aug. 15, 2007. The entirety of the above-mentioned patent application is hereby incorporated by reference herein and made a part of this specification.

BACKGROUND OF THE INVENTION

1. Field of the Invention

The present invention relates to an optical device module, more particularly to an optical lens module.

2. Description of Related Art

In recent years, various kinds of display apparatuses have been widely utilized in daily life. The display apparatuses are, for example, liquid crystal displays (LCDs), plasma display panels (PDPs), projection apparatuses, and so on. The projection apparatuses may be used to largely magnify an image frame with its projection lens, and has gradually become one of the mainstream large-size displays. Generally speaking, if the image frame projected by the projection apparatus is larger, the border of each pixel area in the image frame will be more distinct and may be recognized, which results in an unnatural image frame and deteriorates the quality. For example, when a word appears in the image frame as shown in FIG. 1A, the distinct border of each pixel area may make the letters with jagged contour, which is uncomfortable to look at. In order to solve the above problem, in the conventional art, a reflective mirror capable of swinging back and forth is disposed on the light path of the image beam produced by an optical engine in the projection apparatus, such that the transmission direction of the image beam may be changed back and forth rapidly with a small angle. Therefore, the border of each pixel area will become blurred and unrecognizable, and thus the image frame is more natural and comfortable to look at. For example, referring to FIG. 1B, the blurred border of each pixel area makes the letters in the image frame become more smooth.

The aforementioned reflective mirror capable of swinging back and forth is usually disposed in a reflective mirror module. FIG. 2A is a schematic top view of a conventional reflective mirror module, and FIG. 2B is a cross-sectional view of the reflective mirror module in FIG. 2A taken along line A-A. Referring to FIGS. 2A and 2B, the conventional reflective mirror module 100 includes a foundation 110, a voice coil motor 120 (as shown in FIG. 2B), a lens base 130, a reflective mirror 140, and two shafts 150. The reflective mirror 140 is disposed on the lens base 130. One end of each shaft 150 is solidly connected to the lens base 130, and the other end is pivotally connected to the foundation 110 through a bearing (not shown). The voice coil motor 120 is disposed between one end of the lens base 130 and the bottom of the foundation 110. The top of the voice coil motor 120 is capable of vibrating up and down, so as to drive the lens base 130 to swing back and forth along the shafts 150.

In the conventional reflective mirror module 100, since the voice coil motor 120 is disposed below the lens base 130, the action moment arm and the action torque of the voice coil motor 120 are limited by the size of the lens base 130, and thus the swing speed and angle of the reflective mirror 140 are restricted, thereby restricting the improvement of the image frame. Besides, along with the miniaturization of electronic products, the lens base 130 is made smaller and smaller, so the design that the voice coil motor 120 is disposed below the lens base 130 becomes more difficult to make the reflective mirror 140 swing back and forth at a sufficient high speed and large angle. Moreover, the design that the voice coil motor 120 is disposed below the lens base 130 may restrict the reducing of the thickness of the reflective mirror module 100. Further, when the voice coil motor 120 is powered off, no appropriate external force is provided to make the lens base 130 stay at a specific position, so the reflective mirror module 100 needs an extra feedback control circuit to ensure the lens base 130 smoothly starts to swing from a static state, so as to avoid any collisions or noises in the voice coil motor 120 due to inappropriate application of force. Besides, the bearing in the reflective mirror module 100 easily fails due to abrasion, which may deteriorate the reliability of the reflective mirror module 100.

SUMMARY OF THE INVENTION

Accordingly, the present invention provides an optical lens module, which has a small thickness and low cost, and an optical lens thereof has a high swing speed and large swing angle.

According to an embodiment of the present invention, an optical lens module including a foundation, at least one actuator, a lens base, an optical lens, at least one shaft, and at least one rocker arm is provided. An accommodation space is defined inside the foundation. The actuator is disposed in the accommodation space and fixed on the foundation. The lens base is disposed in the accommodation space and beside the actuator. The optical lens is disposed on the lens base. The shaft has a first end and a second end opposite to the first end. The first end is solidly connected to the lens base, and the second end is connected to the foundation. The rocker arm has a third end and a fourth end opposite to the third end. The third end is solidly connected to a portion of the shaft between the first end and the second end, and the fourth end is connected to the actuator. The actuator is capable of driving the fourth end of the rocker arm to move back and forth along a direction, such that the shaft twists or rotates so as to drive the lens base to swing back and forth.

In the optical lens module, since the actuator is disposed beside, instead of below, the lens base, the optical lens module is thinner in thickness. Moreover, since the actuator drives the rocker arm to make the lens base swing, and since the length of the rocker arm is not restricted by the size of the lens base, the action moment arm of the actuator is longer, thus increasing the swing speed and the swing angle of the lens base.

In order to make the aforementioned and other objectives, features, and advantages of the present invention comprehensible, preferred embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
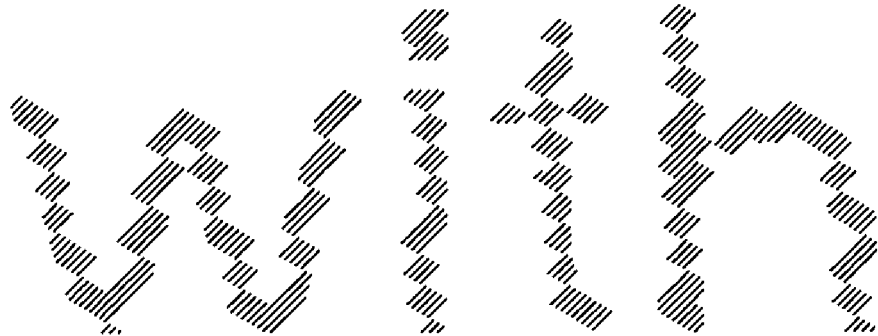
FIG. 1A is an image frame projected by a conventional projection apparatus without using a reflective mirror capable of swinging.
Figure 1B:
FIG. 1B is an image frame projected by a conventional projection apparatus using a reflective mirror capable of swinging.
Figure 2A:
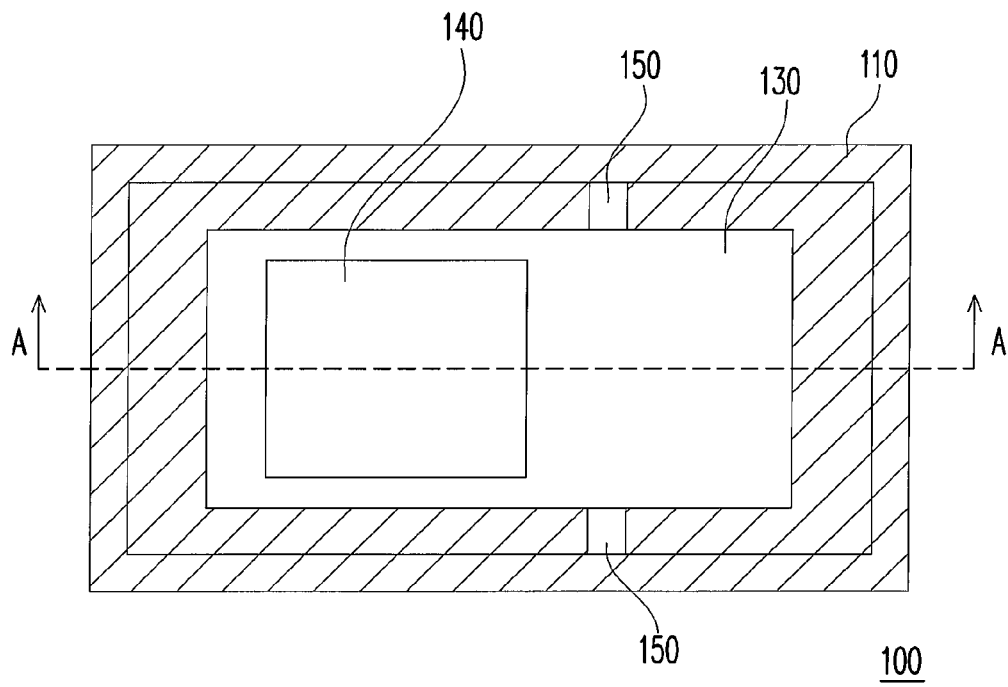
FIG. 2A is a schematic top view of a conventional reflective mirror module.
Figure 2B:
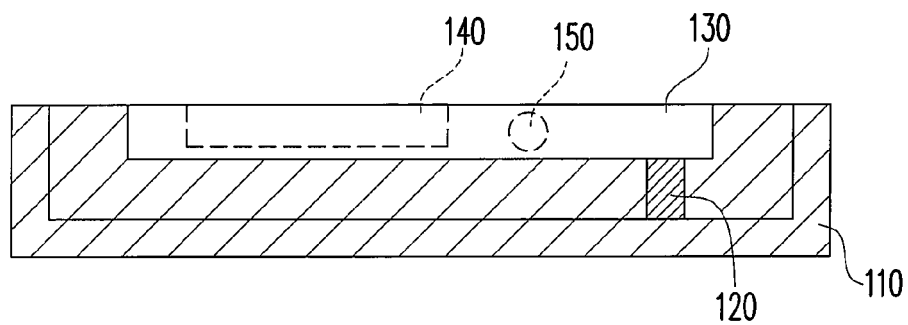
FIG. 2B is a cross-sectional view of the reflective mirror module in FIG. 2A taken along line A-A.
Figure 3A:
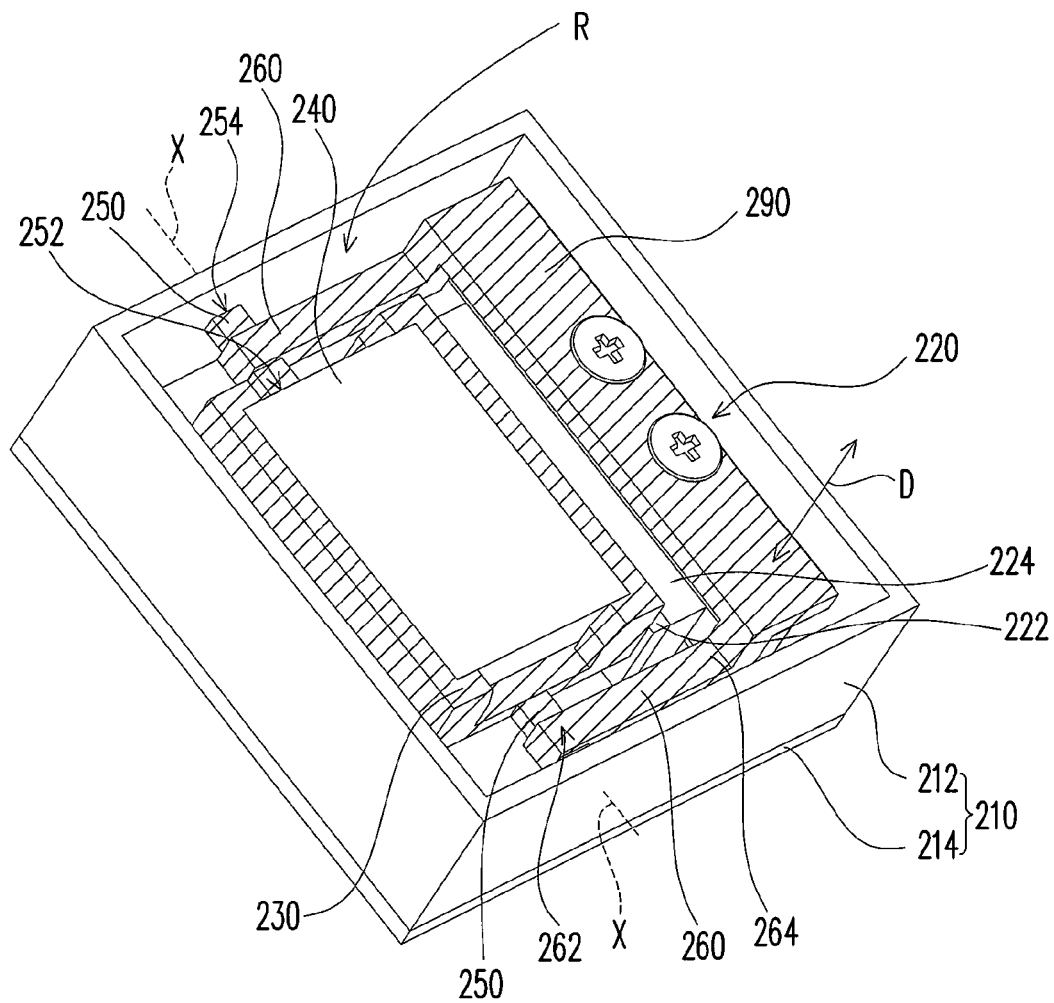
FIG. 3A is a schematic three-dimensional view of an optical lens module according to an embodiment of the present invention.
Figure 3B:
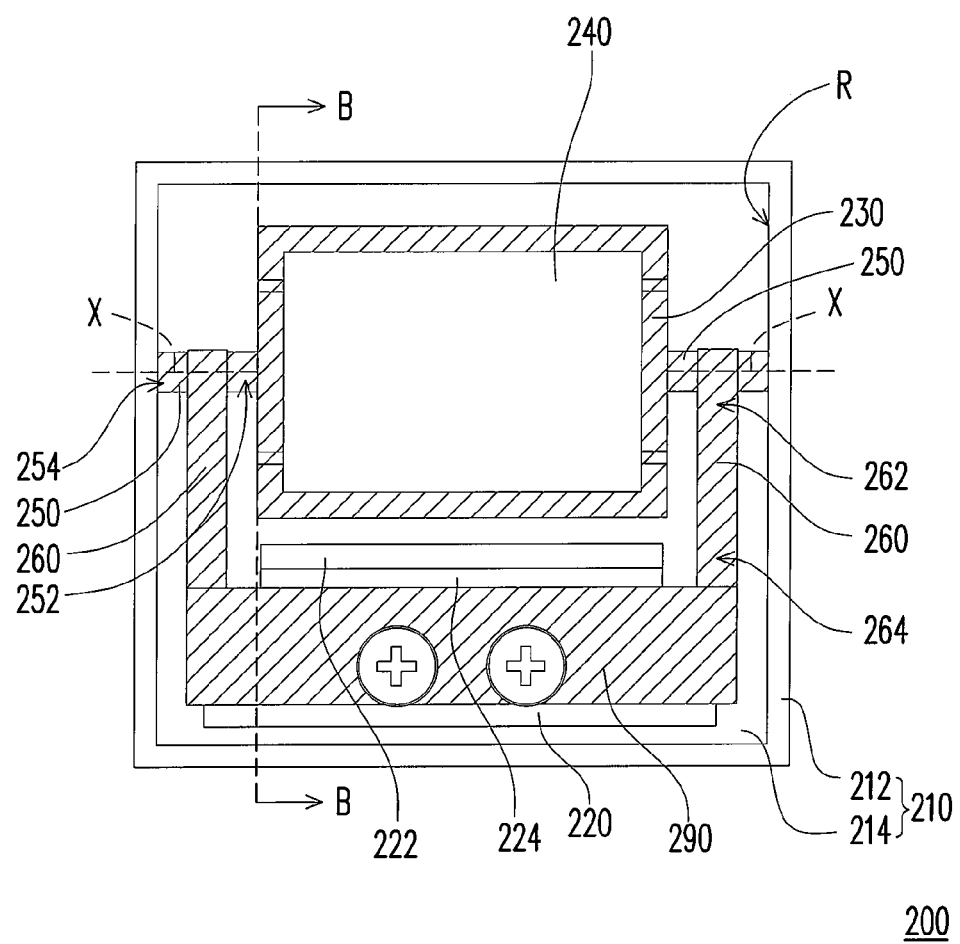
FIG. 3B is a schematic top view of the optical lens module in FIG. 3A.
Figure 3C:
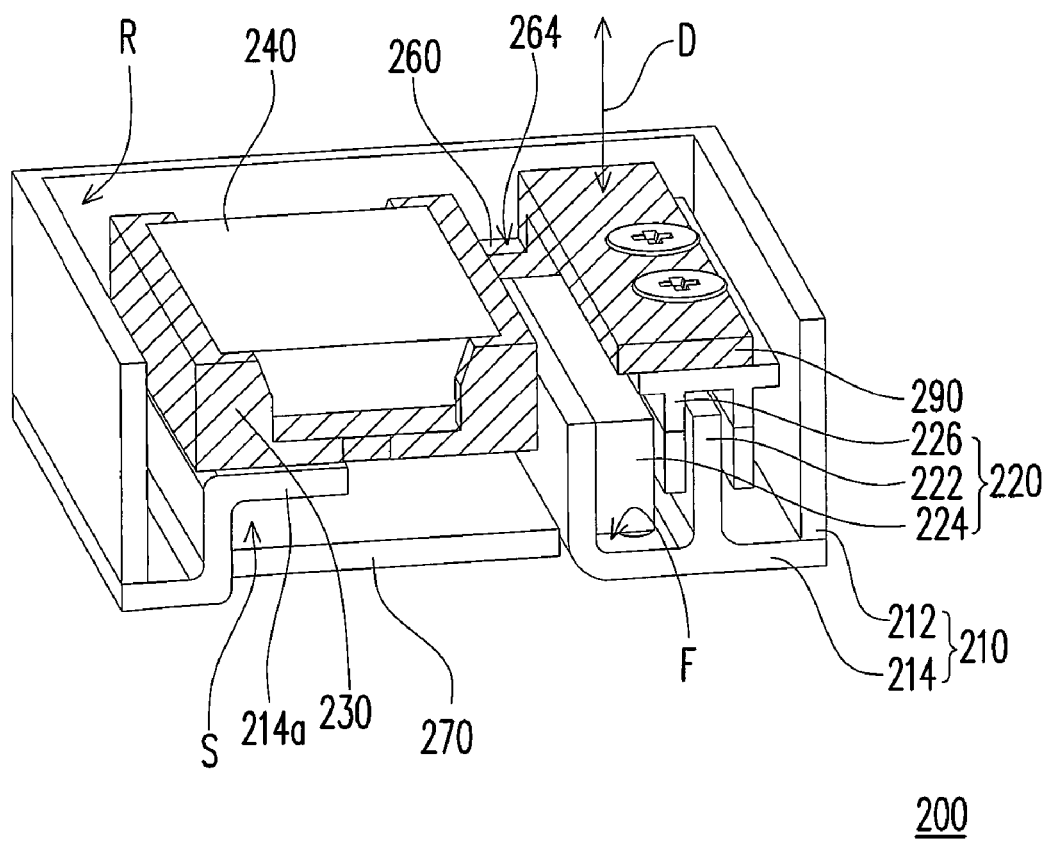
FIG. 3C is a cross-sectional three-dimensional view of the optical lens module in FIG. 3B taken along line B-B.

FIG. 3A is a schematic three-dimensional view of an optical lens module according to an embodiment of the present invention, FIG. 3B is a schematic top view of the optical lens module in FIG. 3A, and FIG. 3C is a cross-sectional three-dimensional view of the optical lens module in FIG. 3B taken along line B-B. Referring to FIGS. 3A-3C, the optical lens module 200 of this embodiment may be applied to a projection apparatus (not shown) to improve the quality of the image frame projected by the projection apparatus. The optical lens module 200 includes a foundation 210, an actuator 220, a lens base 230, an optical lens 240, two shafts 250, and two rocker arms 260. An accommodation space R is defined inside the foundation 210. In this embodiment, the foundation 210 includes a side frame 212, and the accommodation space R is located in the side frame 212. Moreover, the foundation 210 may further include a bottom cover 214 connected to the side frame 212. The actuator 220 is disposed in the accommodation space R and fixed on the foundation 210. In this embodiment, the actuator 220 may be fixed on the bottom cover 214.

The lens base 230 is disposed in the accommodation space R and beside the actuator 220. The optical lens 240 is disposed on the lens base 230. In this embodiment, the optical lens 240 is, for example, a reflective mirror. Each of the shafts 250 has a first end 252 and a second end 254 opposite to the first end 252. The first end 252 is solidly connected to the lens base 230, and the second end 254 is connected to the foundation 210. In this embodiment, the second end 254 of each shaft 250 is solidly connected to the foundation 210. Moreover, the shafts 250 are connected to the side frame 212 of the foundation 210. In detail, the second end 254 of each shaft 250 is solidly connected to the side frame 212. Further, in this embodiment, the shafts 250 are respectively disposed on two opposite sides of the lens base 230.

Each of the rocker arms 260 has a third end 262 and a fourth end 264 opposite to the third end 262. The third end 262 is solidly connected to a portion of the shaft 250 between the first end 252 and the second end 254. In this embodiment, the two rocker arms 260 are respectively solidly connected to the two shafts 250. Moreover, the fourth end 264 is connected to the actuator 220. In this embodiment, the fourth end 264 may be solidly connected to the actuator 220. Further, the actuator 220 is, for example, a voice coil motor. The actuator 220 may include a magnetic bottom 222 connected to the bottom cover 214 and a coil assembly 226 disposed above the magnetic bottom 222 (as shown in FIG. 3C). The optical lens module 200 further includes a fixing unit 290 disposed on the coil assembly 226 and connected to the rocker arms 260. The material of the magnetic bottom 222 is, for example, magnet or other proper magnetic materials. In this embodiment, the magnetic bottom 222 and the bottom cover 214 are integrally formed to reduce the thickness of the optical lens module 200. However, in other embodiments, the magnetic bottom 222 and the bottom cover 214 may also be a combination of separate structures. The magnetic bottom 222 has an accommodation recess F (as shown in FIG. 3C), and a portion of the coil assembly 226 may be located in the accommodation recess F. The actuator 220 may further include a magnet block 224 disposed in the accommodation recess F and beside the portion of the coil assembly 226.

In this embodiment, the fixing unit 290 is, for example, a fixing plate, and is solidly connected to the rocker arms 260. In detail, the fourth end 264 of each rocker arm 260 is solidly connected to the fixing unit 290. The actuator 220 is capable of driving the fixing unit 290 and the fourth end 264 of each rocker arm 260 to move back and forth along a direction D. In detail, when the coil assembly 226 is powered on, the coil assembly 226 moves back and forth along the direction D with respect to the magnetic bottom 222, so as to drive the fixing unit 290 and the fourth end 264 of each rocker arm 260 to move back and forth along the direction D. The back-and-forth movement of the fourth end 264 makes the shafts 250 twist along an axis X, thus driving the lens base 230 to swing back and forth. In this embodiment, the direction D is, for example, approximately perpendicular to the bottom cover 214. The geometric appearances and sizes of the first end 252 and the second end 254 of each shaft 250 may be varied according to the design requirements of the lens base 230 and the foundation 210.

In this embodiment, the optical lens module 200 may be disposed on the light path of the image beam in the projection apparatus, i.e., on the light path between the light valve and the screen. Through the reflection of the optical lens 240 when swinging back and forth, the transmission direction of the image beam is continuously changed back and forth with a small angle, such that the image frame projected on the screen is natural and comfortable to look at, thereby improving the quality of the image frame.

In the optical lens module 200 of this embodiment, since the actuator 220 is disposed beside, instead of below, the lens base 230, the optical lens module 200 may be thinner in thickness. Moreover, in this embodiment, since the actuator 220 drives the rocker arms 260 to make the lens base 230 swing, and since the length of the rocker arms 260 is not restricted by the size of the lens base 230, the action moment arm of the actuator 220 is larger and the action torque of the actuator 220 is bigger, thus increasing the swing speed and the swing angle of the lens base 230. Even if the sizes of the optical lens 240 and the lens base 230 are made smaller and smaller, the rocker arms 260 still provide the action moment arm that is long enough to ensure that the swing speed and swing angle of the lens base 230 are enough.

Furthermore, in this embodiment, since the shafts 250 are solidly connected to the foundation 210 and the lens base 230, when the actuator 220 stops action, the restoring force generated by the twist elasticity of the shafts 250 makes the lens base 230 return to a specific position, for example, a position parallel to the bottom cover 214. Whenever the actuator 220 starts to operate, the lens base 230 starts to swing from the above-mentioned specific position, so the optical lens module 200 makes sure the lens base 230 smoothly starts to swing from a static state without needing an extra feedback control circuit, thus reducing the cost of the optical lens module 200. Further, since each shaft 250 is solidly connected to the foundation 210 instead of being pivotally connected to the foundation 210 through a bearing, the optical lens module 200 of this embodiment does not encounter the problem of the abrasion of the bearing, thus having higher reliability. In addition, since the bearing is not adopted in the optical lens module 200, the cost is reduced.

It should be noted that the actuator 220 is mot limited to be a voice coil motor in the present invention. In other embodiments, the actuator may be a piezoelectric actuator or any other actuator that is capable of driving the fourth end of the rocker arm to move back and forth. Moreover, the fourth end 264 of each rocker arm 260 is not limited to be solidly connected to the actuator 220 in the present invention. The fourth end of the rocker arm may be pivotally connected to the actuator or connected to the actuator in other manners according to different designs or different types of the actuator.

In this embodiment, the bottom cover 214 has an indented portion 214a (as shown in FIG. 3C) indented toward the lens base 230, so as to form an indented space S. The optical lens module 200 further includes a circuit board 270 disposed below the indented portion 214a and inside the indented space S. The circuit board 270 is electrically connected to the actuator 220, so as to drive the actuator 220. The design that the circuit board 270 is disposed in the indented space S may greatly improve the utilization of space, such that the volume of the optical lens module 200 is reduced. Moreover, in this embodiment, the circuit board 270 may be connected to the indented portion 214a through a thermal conductive adhesive or a thermal conductive block, or directly connected to the indented portion 214a, or connected to the indented portion 214a in other proper manners. Thus, the heat generated by the circuit board 270 is dissipated to the outside through the bottom cover 214. However, in other embodiments, the bottom cover may possibly not have the indented portion, and the circuit board is disposed below the bottom cover. Moreover, the circuit board may also be disposed at other positions in the projection apparatus.

Figure 4:
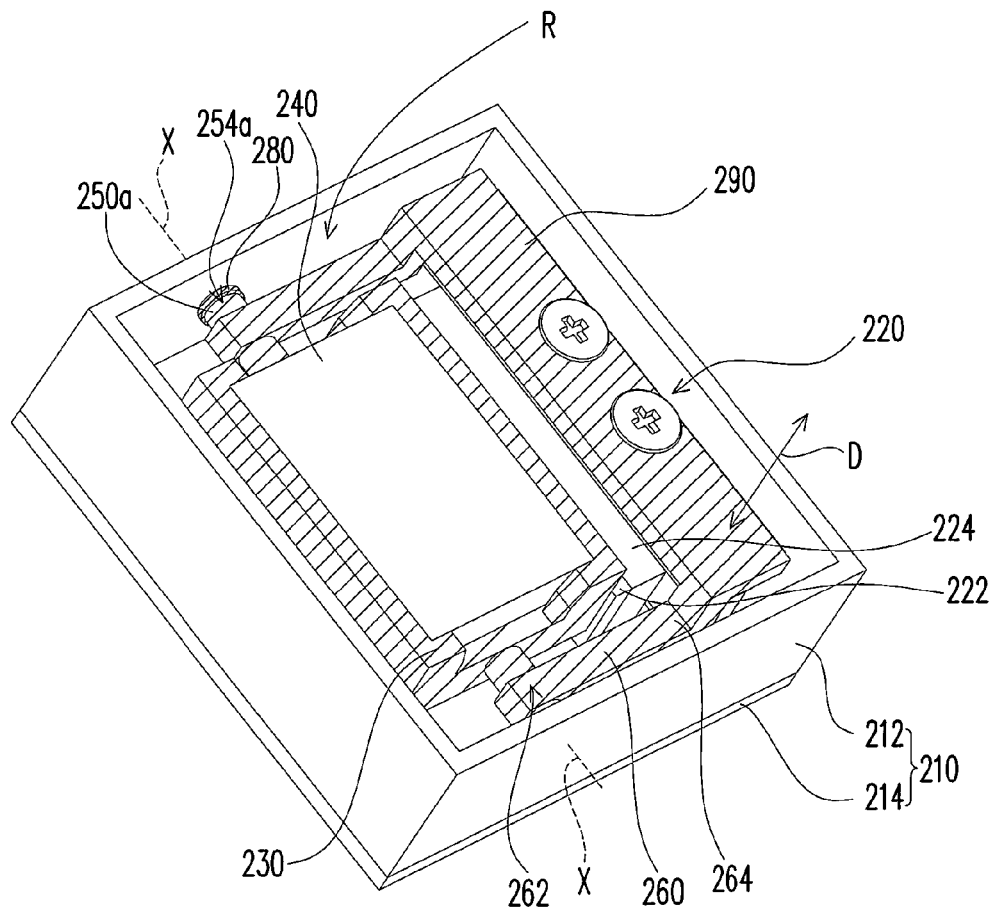
FIG. 4 is a schematic three-dimensional view of an optical lens module according to another embodiment of the present invention.

The second end 254 of each shaft 250 is not limited to be solidly connected to the foundation 210 in the present invention. Referring to FIG. 4, in the optical lens module 200a of another embodiment, the second end 254a of each shaft 250a may be pivotally connected to the foundation 210. In detail, according to this embodiment, the shafts 250a are pivotally connected to the foundation 210 through a bearing 280 disposed between the shafts 250a and the foundation 210. Further, in this embodiment, the shafts 250a are pivotally connected to the side frame 212 of the foundation 210. As such, the actuator 220 drives the shafts 250a to rotate with respect to the foundation 210 along the axis X, thus driving the lens base 230 to swing. The optical lens module 200a of this embodiment has similar advantages and effects as those of the aforementioned optical lens module 200 (referring to FIG. 3A), and the details will not be described herein again.

Figure 5:
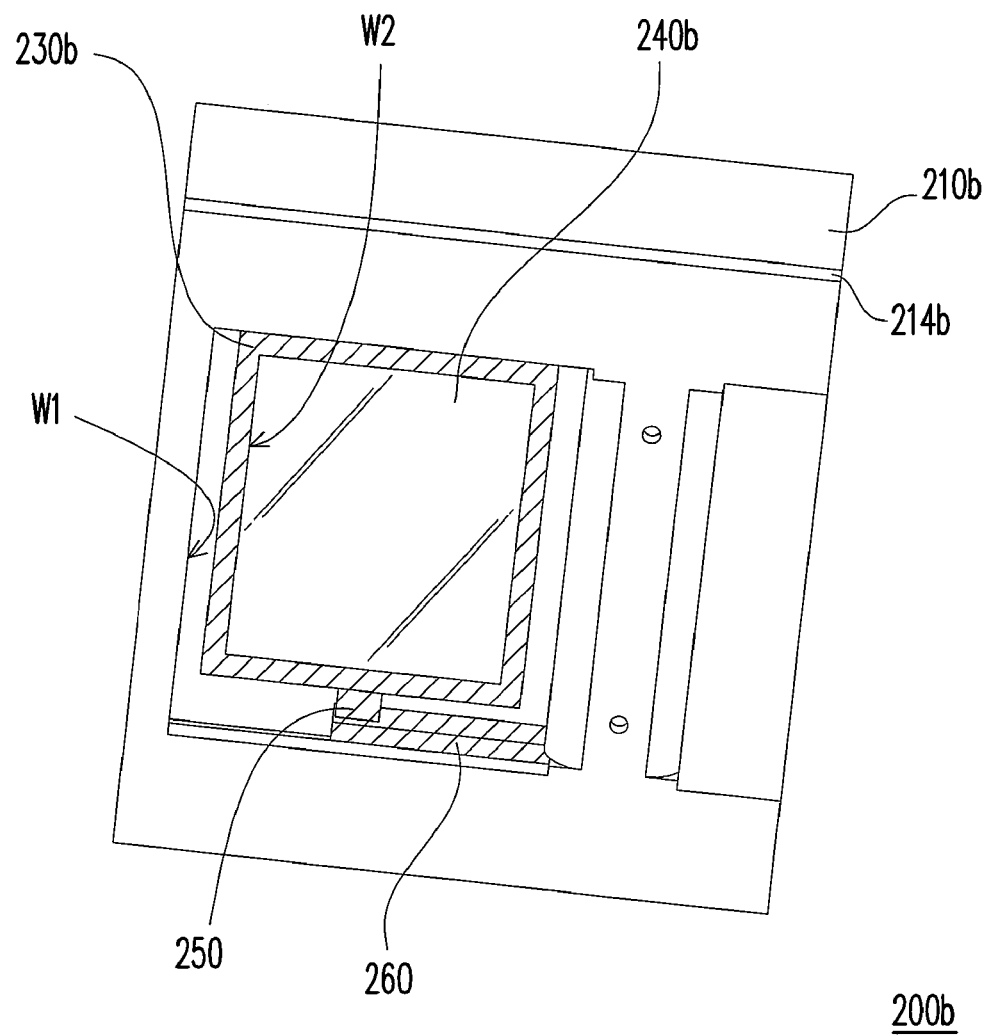
FIG. 5 is a schematic three-dimensional diagram viewing from a side of a bottom cover of an optical lens module according to still another embodiment of the present invention.

FIG. 5 is a schematic three-dimensional diagram viewing from a side of a bottom cover of an optical lens module according to still another embodiment of the present invention. Referring to FIG. 5, the optical lens is not limited to be a reflective mirror in the present invention. In the optical lens module 200b of this embodiment, the optical lens 240b is a transmissive lens capable of allowing light beams to pass through. Moreover, in this embodiment, the foundation 210b may have a first opening W1. In detail, the bottom cover 214b of the foundation 210b may have a first opening W1. Further, the lens base 230b has a second opening W2. The first opening W1 and the second opening W2 are capable of allowing light beams to pass through and to penetrate the transmissive lens 240b, or allowing light beams to pass through after the light beams penetrating the transmissive lens 240b. In other words, the optical lens module 200b may be disposed at a position that the image beam sequentially passes through the first opening W1 and the optical lens 240b, or at a position that the image beam sequentially passes through the optical lens 240b and the first opening W1. Through the back-and-forth swing of the optical lens 240, the transmission direction of the image beam is continuously changed back and forth with a small angle.

Figure 6:
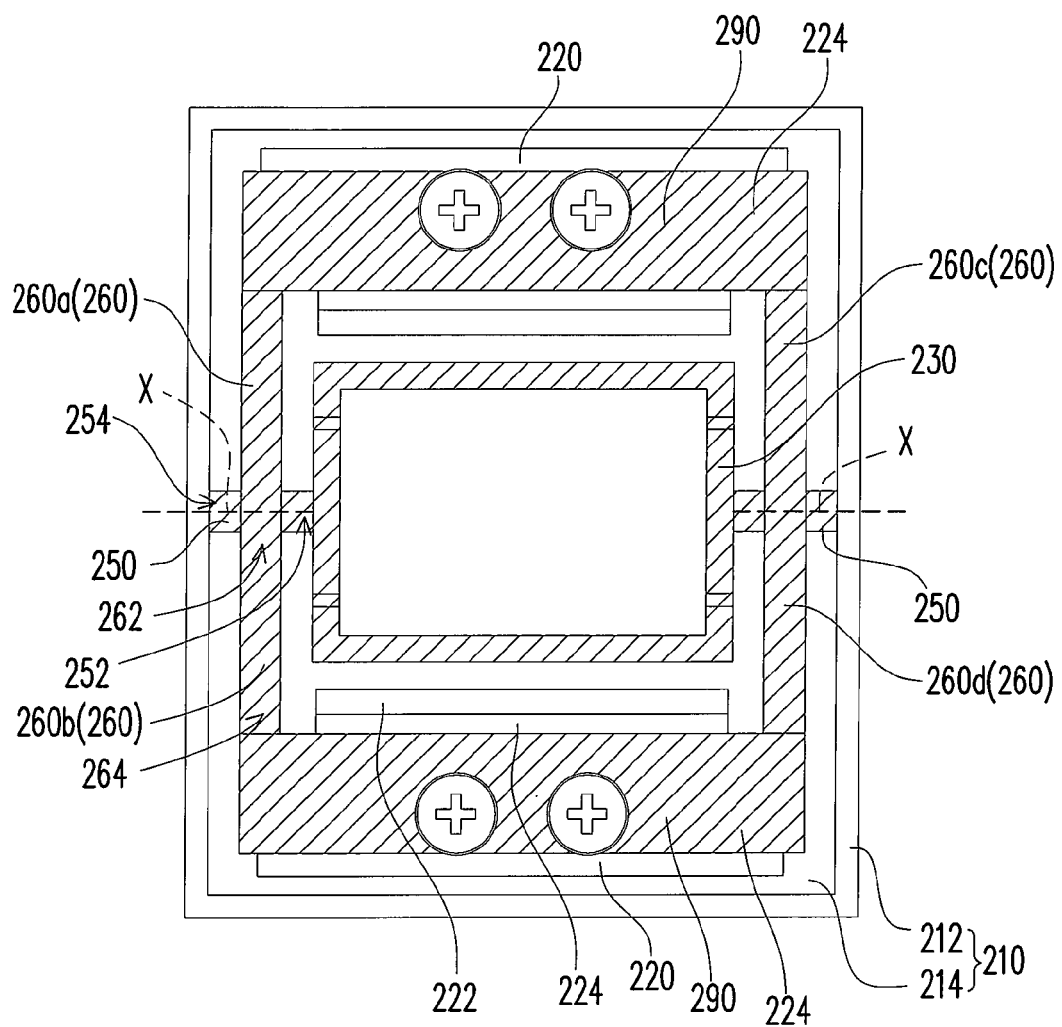
FIG. 6 is a schematic top view of an optical lens module according to yet another embodiment of the present invention.

FIG. 6 is a schematic top view of an optical lens module according to yet another embodiment of the present invention. Referring to FIG. 6, the optical lens module 200c of this embodiment is similar to the optical lens module 200 (referring to FIG. 3A), and the differences therebetween are described as follows. In the optical lens module 200c of this embodiment, the number of the actuators 220 is two, and the number of the rocker arms 260 is four. The actuators 220 are respectively disposed on two opposite sides of the lens base 230. The shafts 250 are respectively disposed on the other two opposite sides of the lens base 230. Two of the four rocker arms 260 are solidly connected to one of the shafts 250 and are respectively connected to different actuators 220. The other two rocker arms 260 are solidly connected to the other shaft 250 and are respectively connected to different actuators 220. Moreover, in this embodiment, the rocker arms 260 solidly connected to the same shaft 250 are integrally formed. In detail, the rocker arms 260a, 260b are integrally formed, and the rocker arms 260c, 260d are integrally formed. However, in other embodiments, the rocker arms solidly connected to the same shaft may also be a combination of separate rocker arms. In this embodiment, the moving directions of the coil assemblies 226 of the two actuators 220 may be opposite, so as to drive the lens base 230 to swing.

It should be noted that, the numbers of the shaft, the rocker arm, and the actuator are not limited in the present invention. In other embodiments, the number of the shaft may also be one. Moreover, the number of the rocker arm(s) may be one or three, or the optical lens module may only have the aforementioned rocker arms 260a, 260b but not the rocker arms 260c, 260d. Further, the actuators 220 in FIG. 3A may also be replaced by a combination of two or more sub-actuators.

In view of the above, in the optical lens modules 200, 200a, 200b, 200c of the embodiments of the present invention, since the actuator 220 is disposed beside, instead of below, the lens base 230, the optical lens modules 200, 200a, 200b, 200c are thinner in thickness. Moreover, in the embodiments of the present invention, since the actuator 220 drives the rocker arms 260 to make the lens bases 230, 230b swing, and since the length of the rocker arms 260 is not restricted by the sizes of the lens bases 230, 230b, the action moment arm of the actuator 220 is larger and the action torque of the actuator 220 is bigger, thus improving the swing speed of the lens bases 230, 230b. Even if the sizes of the optical lenses 240, 240b and the lens bases 230, 230b are made smaller and smaller, the rocker arms 260 still provide the action moment arm which is long enough to ensure that the swing speed and swing angle of the lens bases 230, 230b are enough.

Further, in some embodiments of the present invention, since the shafts 250 are solidly connected to the foundations 210, 210b and the lens bases 230, 230b, when the actuator 220 stops action, the restoring force generated by the twist elasticity of the shafts 250 makes the lens bases 230, 230b return to a specific position. Whenever the actuator 220 starts to operate, the lens bases 230, 230b start to swing from the above-mentioned specific position, so the optical lens modules 200, 200b, 200c makes sure the lens bases 230, 230b smoothly start to swing from the static state without needing an extra feedback control circuit, thus reducing the cost of the optical lens modules 200, 200b, 200c. Further, since each shaft 250 is solidly connected to the foundation 210 instead of being pivotally connected to the foundation 210 through a bearing, the optical lens modules 200, 200b, 200c do not encounter the problem of the abrasion of the bearing, thus having higher reliability. In addition, since the bearing is not adopted in the optical lens modules 200, 200b, 200c, the cost is reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical lens module, comprising:
   a foundation, having an accommodation space defined therein;
   at least one actuator, disposed in the accommodation space and fixed on the foundation;
   a lens base, disposed in the accommodation space and beside the actuator;
   an optical lens, disposed on the lens base;
   at least one shaft, having a first end and a second end opposite to the first end, wherein the first end is solidly connected to the lens base, and the second end is connected to the foundation; and
   at least one rocker arm, having a third end and a fourth end opposite to the third end, wherein the third end is solidly connected to a portion of the shaft between the first end and the second end, and the fourth end is connected to the actuator,
   wherein the actuator is capable of driving the fourth end of the rocker arm to move back and forth along a direction, whereby the shaft twists or rotates so as to drive the lens base to swing back and forth.

2. The optical lens module as claimed in claim 1, wherein the second end of the shaft is solidly connected to the foundation, and the actuator is capable of driving the shaft to twist.

3. The optical lens module as claimed in claim 1, wherein the second end of the shaft is pivotally connected to the foundation, and the actuator is capable of driving the shaft to rotate with respect to the foundation.

4. The optical lens module as claimed in claim 3, further comprising at least one bearing disposed between the shaft and the foundation, such that the shaft is pivotally connected to the foundation through the bearing.

5. The optical lens module as claimed in claim 1, wherein the fourth end of the rocker arm is solidly connected to the actuator.

6. The optical lens module as claimed in claim 1, wherein the number of the at least one shaft is two, and the shafts are respectively disposed on two opposite sides of the lens base.

7. The optical lens module as claimed in claim 6, wherein the number of the at least one rocker arm is two, and the rocker arms are respectively solidly connected to the shafts.

8. The optical lens module as claimed in claim 1, wherein the foundation comprises a side frame, the accommodation space is located in the side frame, and the shaft is connected to the side frame.

9. The optical lens module as claimed in claim 8, wherein the foundation further comprises a bottom cover connected to the side frame, and the actuator is disposed on the bottom cover.

10. The optical lens module as claimed in claim 9, wherein the bottom cover has an indented portion depressed toward the lens base to form an indented space, and the optical lens module further comprises a circuit board disposed below the indented portion and inside the indented space.

11. The optical lens module as claimed in claim 9, further comprising a circuit board disposed below the bottom cover.

12. The optical lens module as claimed in claim 9, wherein the actuator comprises a magnetic bottom connected to the bottom cover and a coil assembly disposed above the magnetic bottom, and the optical lens module further comprises a fixing unit disposed on the coil assembly and connected to the rocker arm.

13. The optical lens module as claimed in claim 12, wherein the magnetic bottom has an accommodation recess, and a portion of the coil assembly is located in the accommodation recess, and the actuator further comprises a magnet block disposed in the accommodation recess and beside the portion of the coil assembly.

14. The optical lens module as claimed in claim 12, wherein the fixing unit is solidly connected to the rocker arm.

15. The optical lens module as claimed in claim 12, wherein the magnetic bottom and the bottom cover are integrally formed.

16. The optical lens module as claimed in claim 1, wherein the actuator comprises a voice coil motor or a piezoelectric actuator.

17. The optical lens module as claimed in claim 1, wherein the number of the at least one actuator is two, the number of the at least one shaft is two, and the number of the at least one rocker arm is four, the actuators are respectively disposed on two opposite sides of the lens base, the shafts are respectively disposed on the other two opposite sides of the lens base, two of the rocker arms are solidly connected to one of the shafts and are respectively connected to the different actuators, and the other two rocker arms are solidly connected to the other shaft and are respectively connected to the different actuators.

18. The optical lens module as claimed in claim 17, wherein the rocker arms solidly connected to the same shaft are integrally formed.

19. The optical lens module as claimed in claim 1, wherein the optical lens is a reflective mirror or a transmissive lens.

20. The optical lens module as claimed in claim 19, wherein the optical lens is a transmissive lens, and the foundation has a first opening, the lens base has a second opening, the first opening and the second opening are capable of allowing light beams to pass through and to penetrate the transmissive lens, or allowing light beams to pass through after the light beams penetrate the transmissive lens.

* * * * *